United States Patent
Gnaedig et al.

(10) Patent No.: US 6,392,766 B1
(45) Date of Patent: May 21, 2002

(54) SCREEN FOR FRONT LASER PROJECTION

(75) Inventors: Klaus Gnaedig, deceased, late of Munich, by Zora Gnaedig heir; Guenther Dausmann, Erding; Thorstein Halldorsson, Munich, all of (DE)

(73) Assignees: DaimlerChrysler AG, Stuttgart; HSM Holographic Systems Muenchen GmbH, Ottersberg, both of (DE)

( * ) Notice: Subject to any disclaimer, the term of this patent is extended or adjusted under 35 U.S.C. 154(b) by 0 days.

(21) Appl. No.: 09/341,273
(22) PCT Filed: Dec. 4, 1997
(86) PCT No.: PCT/EP97/06774
§ 371 Date: Sep. 2, 1999
§ 102(e) Date: Sep. 2, 1999
(87) PCT Pub. No.: WO98/30924
PCT Pub. Date: Jul. 16, 1998

(30) Foreign Application Priority Data

Jan. 7, 1997 (DE) .......................... 197 00 162

(51) Int. Cl.$^7$ ................................. G02B 5/32
(52) U.S. Cl. ................ 359/15; 353/122; 358/60; 359/24; 359/32; 359/443
(58) Field of Search ................ 353/112; 358/60; 359/15, 24, 32, 443

(56) References Cited

U.S. PATENT DOCUMENTS

| | | | | |
|---|---|---|---|---|
| 4,297,723 A | * | 10/1981 | Whitby | 358/60 |
| 4,960,311 A | | 10/1990 | Moss et al. | |
| 4,984,856 A | | 1/1991 | Moss et al. | |
| 4,995,719 A | * | 2/1991 | Shanks | 353/122 |
| 5,372,900 A | | 12/1994 | Minami | |
| 5,930,011 A | * | 7/1999 | Gambogi, Jr. et al. | 359/15 |

FOREIGN PATENT DOCUMENTS

| | | | | |
|---|---|---|---|---|
| DE | 34 19 098 | | 11/1985 | |
| EP | 0 465 429 | | 1/1992 | |
| FR | 2 640 772 | | 6/1990 | |
| FR | 2699289 A1 | * | 12/1992 | 359/15 |
| FR | 2 699 289 | | 6/1994 | |

* cited by examiner

Primary Examiner—Cassandra Spyrou
Assistant Examiner—Craig Curtis
(74) Attorney, Agent, or Firm—Crowell & Moring LLP

(57) ABSTRACT

In a holographic screen for laser front projection, of at least one or more laser wavelengths that selectively back-scatter the incident spectrally narrow-band laser radiation in a predetermined solid angle and simultaneously highly absorbs the disturbing spectrally broad-band ambient light, it is proposed that it have at least one holographic volume grating that is optically coupled to a light absorber.

14 Claims, 5 Drawing Sheets

SCREEN FOR FRONT LASER PROJECTION

BACKGROUND AND SUMMARY OF THE INVENTION

The invention relates to a method for manufacturing and using a screen for laser front projection of one or more laser wavelengths, which screen selectively back-scatters the incident narrow-band laser radiation in a previously determined solid angle, but simultaneously considerably absorbs the disturbing broad-band ambient light.

Shortly after powerful lasers operating in the visible region of the spectrum became available in the 1960s, initial attempts at laser projection of images on walls and screens also took place. In this connection see for example C. E. Baker, "Laser Display Technology," IEEE Spectrum, December 1968, pp. 39–50. At the 1970 World's Fair in Osaka, Japan, Hitachi presented a laser color television production on a projection screen measuring approximately three meters by four meters, as described for example in the article "Large Color Television Projection by Laser" in the journal Funkschau, Volume 4, 1970.

Although these first laser projections achieved significant quality in terms of image brightness, resolution, and color fidelity, the technical investment and cost remained very high, especially because of the inefficient argon and krypton lasers used. These lasers had an electrical-optical conversion efficiency of less than 0.1 percent. Consequently, laser projection remained limited to scattered applications such as light shows, special large-image displays in the military area, or for flight simulation in pilot training.

In recent years, the technical requirements for producing laser displays have considerably improved, as for example in the article by C. Deter, "Laser display technology—where are we?", in the journal Physikalische Blätter, 52, (1996), No. 11, p. 1129. Today, much more efficient and economical diode-excited solid-state lasers or fiber lasers, and in the future laser diodes as well, with an electrical-optical efficiency of 10–30 percent can be used for image projection in the monochromatic laser colors of red, green, and blue (RGB). To produce an image by scanning, deflection units built using less expensive silicon technology will be available.

It can be expected that in the case of the projection methods already introduced, which operate similarly to slide projection using the light valve principle, liquid crystals or micro-mirror matrices that can be modulated (as well as in the future multicolored laser light) will be used.

An image can be generated on the screen basically in two ways, by front projection or rear projection. In the former case, the image is cast on the surface of the screen that is also viewed. In this case, this screen must back-scatter the incident light as much as possible. In the second case, the image is projected on the opposite side of the screen. The screen must then allow the light to pass through as much as possible but, at the same time, must forward scatter over a larger angle. The invention relates exclusively to the first method of front projection and reproduction of the back-scattered light, and the design and manufacture of such a screen for laser projection.

One of the principal advantages of laser image projection is the high luminance that can be produced with lasers in contrast to other sources, even on large projection screens. The photometric luminance (cd/m2) in the visible portion of the spectrum corresponds radiometrically to the radiance of a light-emitting surface, in other words, the power radiated in the solid angle by a unit area (w/sr m2). The radiance of conventional thermal radiation sources such as incandescent lamps, arc lamps, or gas discharge lamps has a physical limit set exclusively by its color temperature, in other words the color-equivalent temperature of the black body. An increase in its radiance by raising the temperature is only possible with a simultaneous shift of the color toward shorter wavelengths and the associated change in psychophysical color (blue tinge). Since the product of the projection angle and the area of the image exit opening are fixed for each system, it basically limits the light flux that can be used for projecting thermal radiators.

This product, the light emittance of the optical system, is very low in the case of lasers and permits a very sharp bundling of the radiation by the exit opening of the projector. As a result of the spectrally selective light amplification used in lasers, in contrast to thermal radiators, with a correspondingly strong excitation, the output power and hence the radiance that can be achieved in the useful beam are theoretically unlimited.

Since almost all colors in the color triangle can be produced by adding the narrow-band laser lines of the RGB colors, lasers are especially well suited as light sources for projection systems because of the above-mentioned advantages. This is true for both known projection methods: both for those that generate the image serially by point by point scanning of the screen with a bundled and modulated beam, and those in which all of the image points in an image matrix are illuminated simultaneously and projected on the screen.

However, a high luminance of the image is not sufficient by itself to produce images on the screen with high contrast and good color quality, since, because of the background brightness of the surrounding area, the brightness of the darkest point on the screen cannot go below this level and the color perceived by the eye is formed by the sum of the background color of the screen influenced by the environment and the color of the projection at the moment.

The contrast that can be achieved during image reproduction as a ratio of the maximum and minimum luminances therefore depends on the ambient illumination. In dark rooms, good projectors offer a perceived contrast of more than 200:1. In practical operation in bright rooms, the values are about 40:1. This is the result of the increase in the black value by the ambient light and the distortion of the gray level graduation of the eye at higher luminances (Wber-Fechner Law). The perceived psychophysical color and color contrasts are simultaneously altered in the same way by the ambient light.

These problems of image reproduction have been known for a long time in television technology, see for example "Fernsehtechnik, Hüttig Verlag, Heidelberg, in 1988 and are eliminated by a so-called "black matrix". The black matrix is supported inside the image tube on optically unused parts of the image tube and absorbs the ambient light.

Any increase in the luminance of the screen in front projection using cathode ray tubes, liquid crystal or micro-mirror matrices is achieved by using a special optical coating on the screen that back-scatters the light in a narrow angle and/or by concave curvature of the surface of the screen. At the same time the contrast is improved, since the ambient light striking this screen laterally is no longer diverted toward the viewer.

Several experiments are also known involving projection of broad-band light on special holographic screens; see for example R. L. Shie, C. W. Chan, and J. M. Lerner, "Surface relief holography for use in display screens," SPIE, Vol. 2407, pp. 177–184. Here, the light scattering of a surface relief hologram is used for image reproduction and the scattering characteristic is adjusted by a special design of the hologram.

Despite these measures, however, no one has yet succeeded in achieving approximately the same quality of brightness, contrast, and color reproduction of a front projection in bright rooms as with direct display on the screen of a cathode ray tube.

On the other hand, the basic problems with image tubes persist: their volume and weight. Large images therefore can only be produced separately on image tubes arranged side by side, with the known disadvantages of disturbing spaces in between, nonuniform brightness, and unbalanced colors.

The goal of the invention is to provide, preferably for laser projection, a projection screen which back-scatters the narrow-band laser light in one or more colors with high efficiency in a specific solid angle, but largely absorbs the broadband ambient light and thus avoids the disadvantages of known screens.

With this projection screen according to the invention, for the first time large images can stand out from the bright surroundings even with normal ambient illumination in bright rooms or in daylight. Secondly, the contrast originally available in the device is provided to the viewer via the screen. Thirdly, color distortion or shift by undesired addition of the image colors to those of the environment is minimized.

This goal is achieved according to the invention by a holographic screen. The object of this holographic screen is preferably an adapted white screen on which all the laser projection wavelengths used in the hologram preferably shine. During recording, care is taken to ensure that the screen is illuminated with the object beam so that its back-scattering characteristic is the same as desired later in the application. An expanded beam bundle is employed as the reference beam in the holographic recording, and takes its departure from a suitable location like the later projection beam. For reproduction, either a surface beam as in the recording or a beam that scans point by point can be used in a hologram.

In order to exhibit the required angle and wavelength selectivity, the holographic screen must have the properties of a volume hologram. This is advantageously achieved by recording a reflection hologram in one or more "thick" recording layers (approximately 5 to 30 μm). Volume grating structures result during the recording and processing of the hologram as an image of the screen independently of one another at the various wavelengths used. Under the so-called Bragg interference condition of the grating structure, which is fulfilled each time only for one wavelength and one illumination angle, light is reflected backward. When the hologram is viewed, a bright reflected image of the screen appears, with its original scatter characteristic. This is repeated for other discrete wavelengths with their associated grating structures within the same layer or other layers to form a superimposed total image which, when the color tuning is correct, shows the image of the original white screen. Light of other wavelengths as well as broadband light, because it fails to comply with the Bragg conditions, is allowed to pass through largely unattenuated if it does not strike exactly from the direction of laser projection.

If the hologram is mounted on a black layer in optical contact, the holographic screen appears dark or black under surface illumination with broad-band ambient light. On the other hand, if the surface of the holographic screen is scanned by laser beams from the correct illumination direction, in other words from the location of the previous fixed reference beam, the original image of the screen is again built up serially. If the individual laser beams are modulated with image data, the viewer sees in the holographic recording light the image as if it were appearing on the original screen but only with the improvements according to the invention described above.

Even when the light valve principle is used for image modulation, in other words the surface illumination and projection of an image matrix, the screen recorded in this fashion may be used. Care must be taken however that the same laser lines are used during recording and reproduction, and that projection takes place from the same location as the reference beam. To secure good image quality, care must be taken to ensure that the distance of the image source from the screen approximately corresponds to a point source, which is always the case at conventional projection distances.

The production of a holographic projection screen according to the invention is described above as an example. However, it can be performed in a number of different ways and in different steps that are known and understandable to the individual skilled in the art. The invention will be described in greater detail below with reference to the embodiments shown partially schematically in the figures.

DETAILED DESCRIPTION OF THE DRAWINGS

Figure 1:
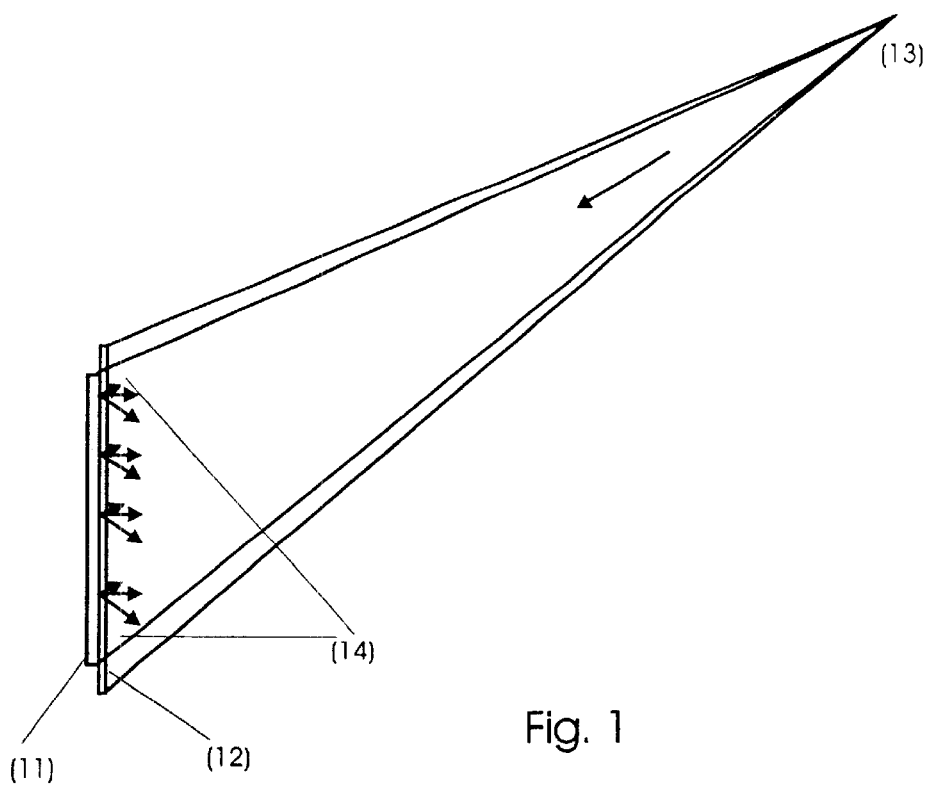
FIG. 1 shows the direct recording of a reflection hologram of a projection screen using the known method of Yu. N. Denisyuk.

FIG. 1 shows the recording of a reflection hologram of a screen in a step using the method of Denisyuk. Screen (11), for example a highly back-scattering scattering disk, is placed directly on holographic recording material (12) and illuminated with laser light with a point of divergence (13) that corresponds to the projection point used in the later application. The direct beam forms the reference beam, the laser light (14) which passes through the holographic material and is back-scattered from the screen forms the source of the scattered radiation, and hence the object light. The image plane in this recording method is located practically in the plane of the hologram material. The same is true during projection.

Figure 2:
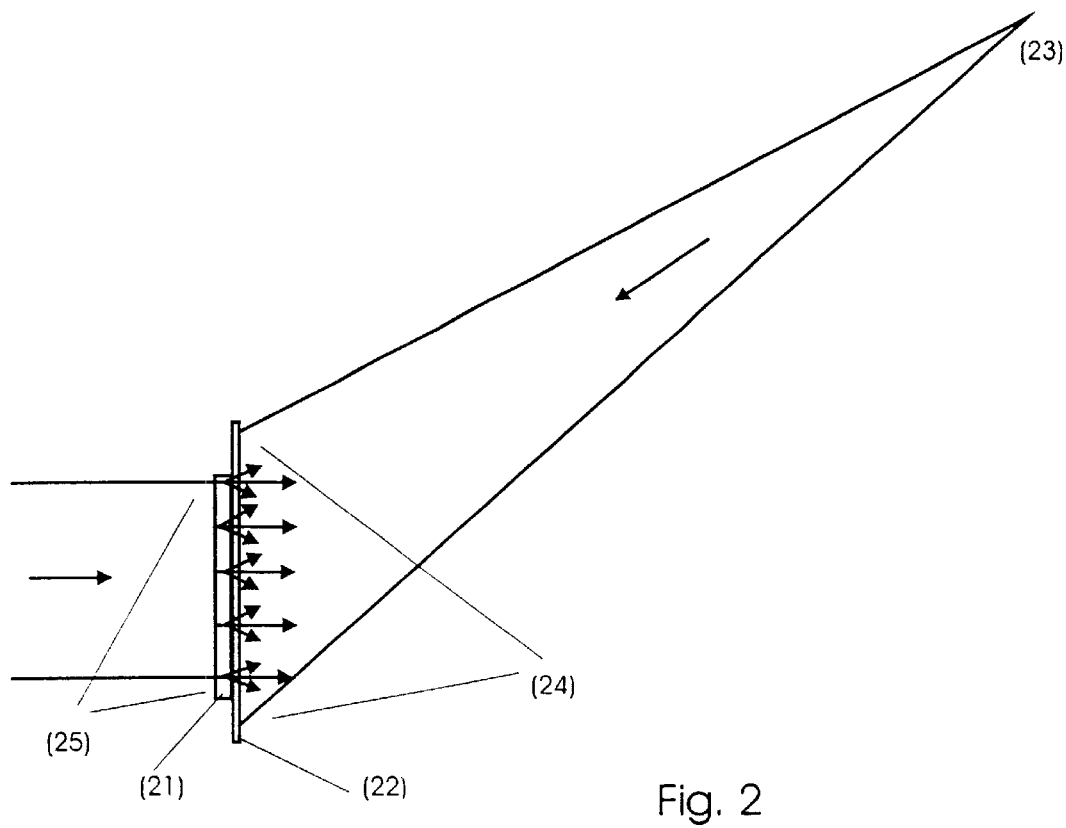
FIG. 2 shows the direct recording of a reflection hologram of a transparent screen similarly to the method of Denisyuk but with additional object light.

FIG. 2 shows the recording of a holographic projection screen, likewise in one step. Screen (21) in this case is a transparent scattering disk that is illuminated from behind and which in turn is placed directly on the holographic recording material (22). As a result of illumination (25) from the rear, the object-reference-ratio during recording, the brightness distribution over the screen, and geometric parameters of the scattered light (24) such as the scatter angle and the scatter lobe can be adjusted independently of the optimization of the holographic projection screen.

Figure 3:
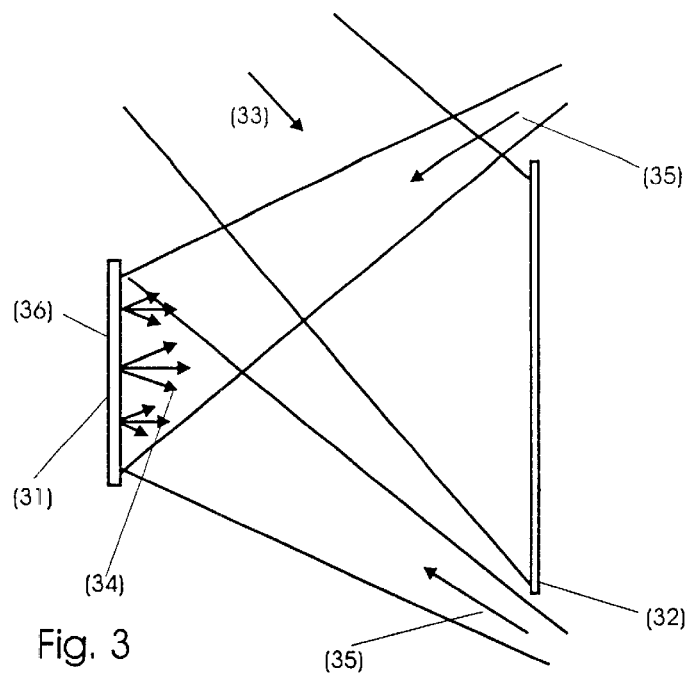
FIG. 3 shows the illumination of a transmission master hologram of a screen.

FIG. 3 shows the recording of a transmission master hologram of a projection screen for a two-stage manufacturing method. Here screen (31) is illuminated for example by two object beams. The reference light (33) strikes the holographic plate (32) from the same side as does the object light (35) in the form of scattered light (34) from the screen (31). The master can be used either as an independent screen hologram or as an interface for additional hologram recordings.

Figure 4:
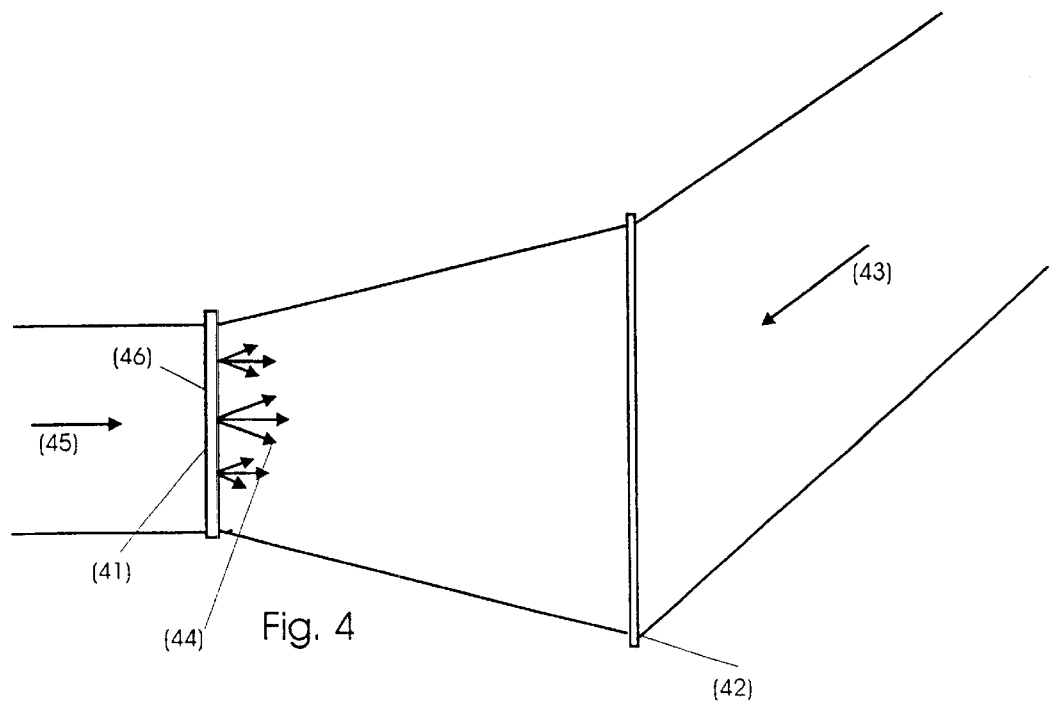
FIG. 4 shows the illumination of a reflection master hologram of transparent screen.

FIG. 4 shows the recording of a master hologram of a transparent screen (41) using reflection technology for a similar two-stage manufacturing method. In this case, reference light (43) strikes holographic plate (42) from the side opposite object light (44). In this case, screen (41) is preferably illuminated from the rear, so that for example advantages are realized regarding the luminous intensity of the system and corrective measures are readily possible regarding the scattered light distribution.

Figure 5:
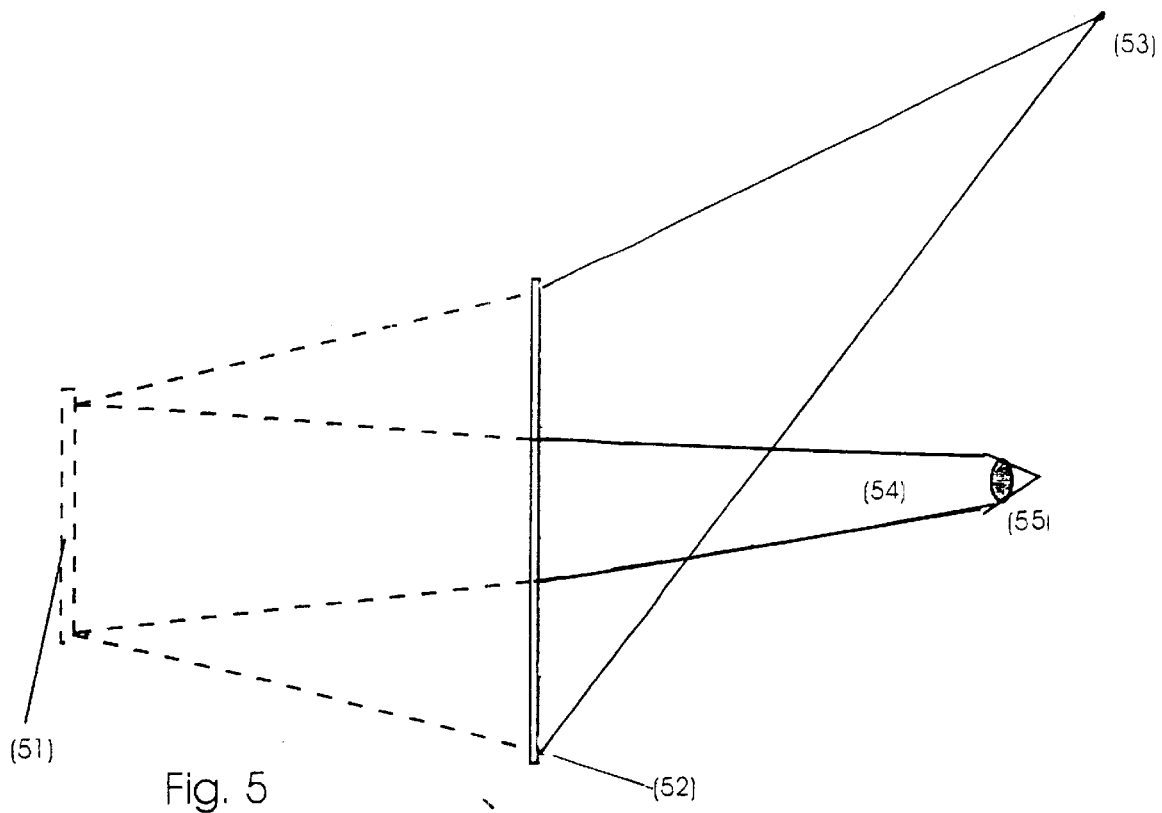
FIG. 5 shows the production of the virtual image of the screen during illumination of the reflection master hologram in FIG. 4 from the reference point.

FIG. 5 shows the production of a virtual image (51) of the screen by a scanned laser beam (53) in the example of the reflection master which is produced behind the holographic plane (52). A portion of the reconstructed light (54) strikes the eye (55) of the observer. Such screen holograms can also be used directly, for example for applications in the near vision field as a desk top computer screen with an expanded image distance to facilitate accommodation of the eyes.

Figure 6:
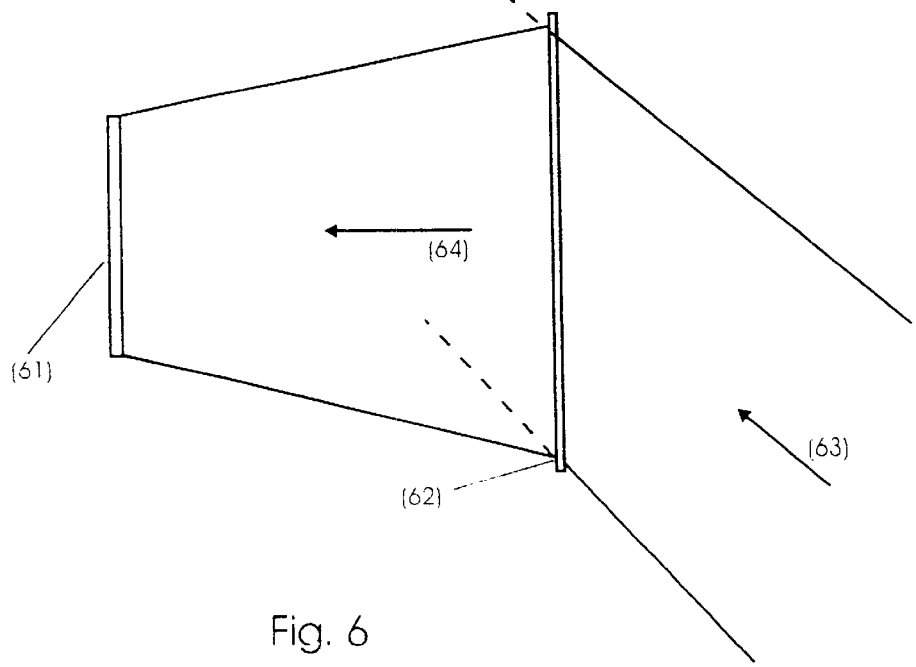
FIG. 6 shows the reconstruction of the real screen image from the transmission master hologram in FIG. 3 with the conjugate reference beam.

FIG. 6 shows the reconstruction of a real image of screen (61) using the example of a transmission master (62). If the real image (61) is to correspond in dimension and position to the original screen, the conjugate beam (63) to the reference beam during recording must be used for this purpose, from which the master hologram produces the reconstruction light (64).

Figure 7:
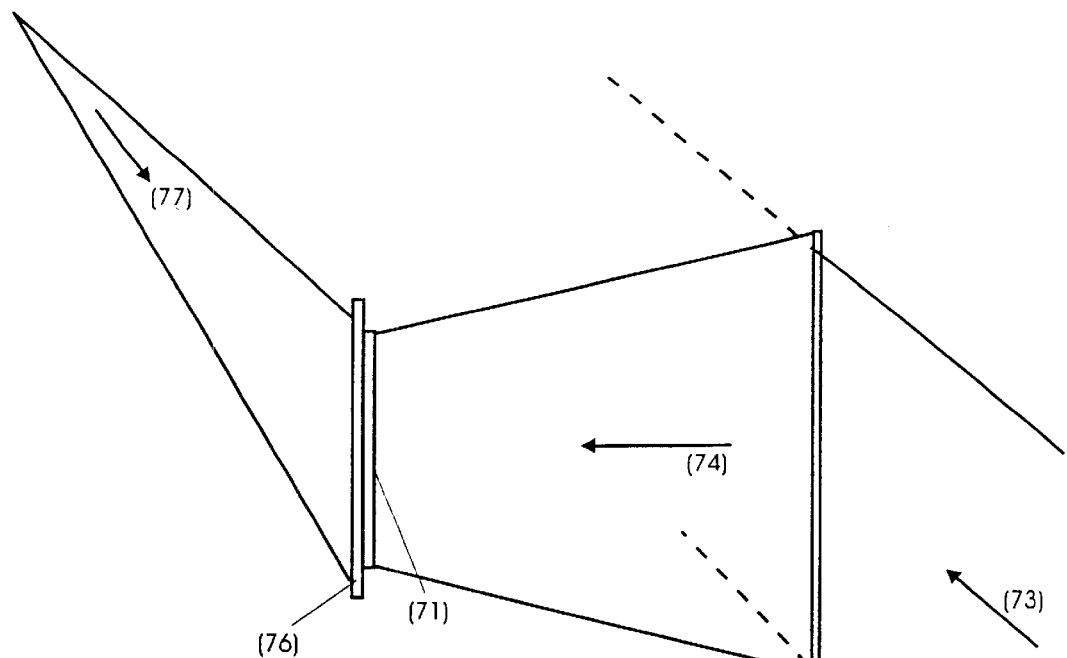
FIG. 7 shows the illumination of the holographic projection screen by a real reconstruction of the transmission master hologram.

FIG. 7 shows the "re-copying" of the transmission master to a holographic projection screen as an image plane hologram of the original screen. For this purpose of "re-copying", a real image of screen (71) is produced by the reconstruction beam (73) conjugate to the reference from the transmission master hologram (72). In the location of the real image, the holographic recording material (76) is placed and additionally illuminated with a reference beam (77) which must correspond in its geometry to the later projection geometry, as already stated above.

Figure 8:
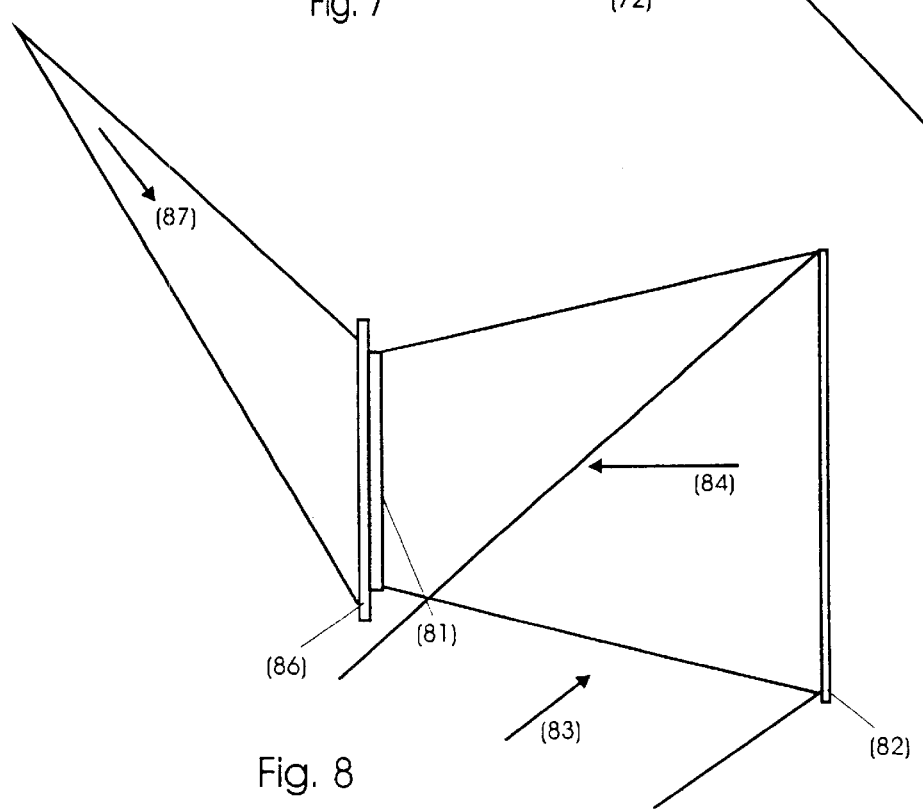
FIG. 8 shows the illumination of the holographic projection screen by a real reconstruction of the reflection master hologram.

FIG. 8 shows the similar process of re-copying during the use of a reflection master. For this purpose, once again a real image of screen (81) is generated by the reconstruction beam (83) conjugate to the reference beam of recording and places the holographic recording material (86) at the location of the image, and in addition to this object light, strikes it with a reference beam (87) which in turn must correspond in its geometry to the later reflection geometry.

Figure 9:
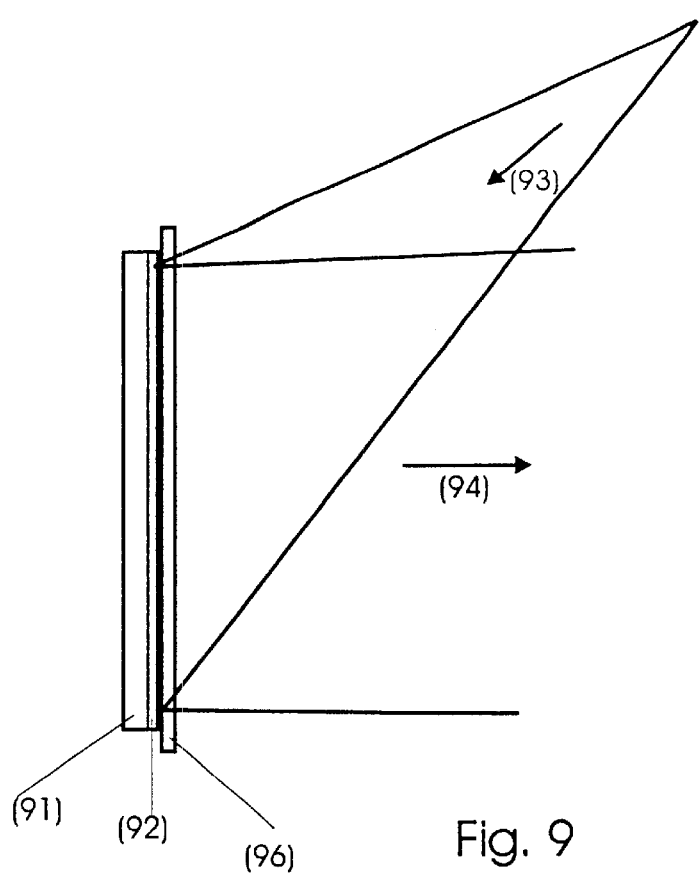
FIG. 9 shows contact copying of the holographic projection screen as the preferred mass production method.

A preferred economical method for mass production of holographic projection screens is shown in FIG. 9. In this contact copying method, a so-called copying master (91) in the form of a finished illuminated hologram screen is used and non-illuminated holographic recording material (96) is arranged in direct contact with the holographic layer (92) of the copying master (91). By laser illumination (93) with the approximate reference geometry of the master, the grating structure is transferred to the copy material and a new holographic screen is produced as a result.

Figure 10:
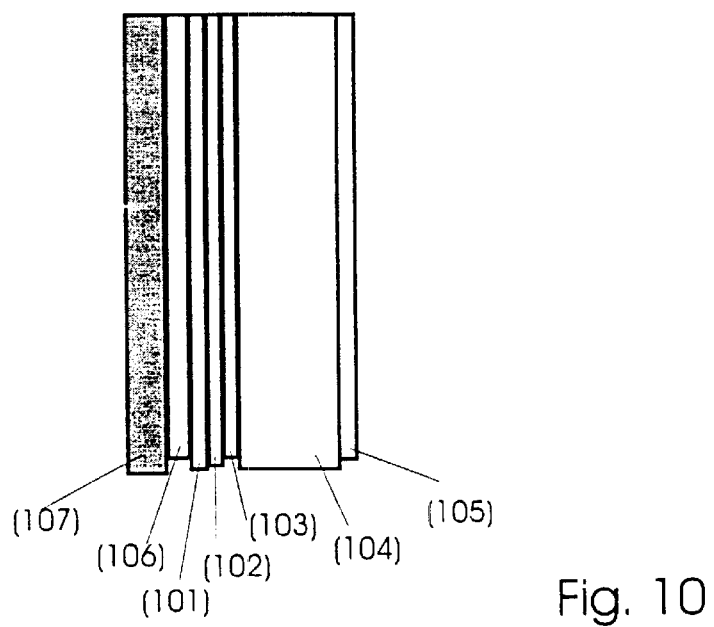
FIG. 10 is a cross section through a sample finished holographic projection screen with three holographic recording layers for the colors red, green, and blue.

FIG. 10 shows a cross section through a finished holographic projection screen for the case according to the example in which three recording layers were used for the three colors red (101), green (102), and blue (103). The holographic screen is preferably a sandwich of a transparent carrier layer (104), for example made of glass or acrylic glass, that is provided with a coating (blooming coat) (105), with holographic layers (101,102,103) and a light-absorbing layer (107) possibly optically coupled by a refractive index adapted adhesive or intermediate layer (106). However, a single holographic layer may also be present in which three grating structures for three colors are laid down, or other combinations of layers and colors.

As recording material for the "thick" holograms, preferably a silver halide material, dichromate gelatin, or photopolymer materials are used. Basically, all materials with which angle and wavelength selective holographic gratings with the properties of volume gratings can be produced are suitable.

The diffractive holographic grating structures for three basic colors can basically be produced with three lasers in these basic colors by simultaneous or successive illumination in one or more recording layers, if the subsequent further processing takes place with color fidelity, in other words, the reproduction wavelength of the holographic grating is equal to the recording wavelength after processing. However, if shrinking or swelling of the layers takes place during processing, the reproduction wavelengths will shift. As is known to the individual skilled in the art, this can also be used to produce holographic grating structures for different colors during illumination at only one laser wavelength as a result of previous or subsequent swelling or shrinking of the recording layers.

The location of the reference starting point during the illumination of the holographic projection screen depends on the later desired location of the projector. For large projections in living rooms and also in larger spaces, the projector would preferably be located on the ceiling of the room and a connection with the laser emitter would preferably be made by light guide fibers.

Projection or scanning angles can differ depending on the application, for example 30°×30° or 45°×45°. Different azimuth and elevation angles can likewise be provided. These geometric parameters are all involved in recording geometry.

The screen for the holographic recordings does not have to be flat. Curved screen surfaces can be used, and surfaces shaped three-dimensionally as desired can also be used for special types of projection, for example the surfaces of columns for displaying advertisements or of plaster heads.

By including additional optical elements in the beam path of the reference or object beam, the holographic image of the screen can be influenced, for example in the brightness distribution of the reproduction or for targeted correction of image errors that can occur as a result of scanning for example.

Instead of interference-optically recorded master holograms, holograms can also be used that are computer-generated or produced by computer-generated holograms in which a certain scatter function has been laid down by a by computer.

Of course the holographic screen according to the invention can be used for one or several laser lines. These laser lines need not necessarily be in the visible spectrum but, if suitable recording materials are used, can be in the UV or IR range, for recording images with technical sensors such as cameras, photodetectors, or photodetector arrays.

In addition, the screen according to the invention can be used with other narrow-band light sources such as lamps with monochromatic light emission and narrow-band LEDs.

What is claimed is:

1. A screen for laser front projection of at least one or more laser wavelengths, comprising: a holographic projection screen having an image plane, said holographic projection screen selectively back-scattering incident spectrally narrow-band laser radiation in a previously determined solid angle and simultaneously highly absorbing interfering broad-band ambient light, said holographic projection screen comprising at least one holographic volume grating optically coupled to a light absorber, said image plane being located practically in a plane of the holographic volume grating.

2. The screen according to claim 1, wherein the holographic projection screen has an additional transparent carrier layer.

3. The screen according to claim 1, wherein the holographic projection screen has at least one additional coating layer.

4. The screen according to claim 1, wherein the holographic projection screen has three holographic volume gratings that have three basic colors.

5. The screen according to claim 1, wherein the light absorber is a black film optically coupled by an adhesive layer.

6. The screen according to claim 1, wherein the light absorber is black glass.

7. The screen according to claim 1, wherein the light absorber is a cavity absorber.

8. The screen according to claim 1, wherein in at least one recording step, brightness distribution and image errors are corrected by additional optical elements arranged in a beam path.

9. The screen according to claim 1, wherein images are produced by serial point scanning of a modulated beam on the holographic projection screen.

10. The screen according to claim 1, wherein images are produced by flat projection of an image matrix on the holographic projection screen.

11. The screen according to claim 2, wherein the holographic projection screen has at least one additional coating layer.

12. The screen according to claim 11, wherein the holographic projection screen has other combinations of holographic layers and associated basic colors.

13. The screen according to claim 4, wherein the holographic projection screen contains said three holographic volume gratings in one layer.

14. The screen according to claim 4, wherein the holographic projection screen has said three holographic volume gratings in three holographic layers, each of which is associated with one of the three basic colors.

* * * * *